United States Patent [19]

Ukegawa

[11] Patent Number: 5,150,400

[45] Date of Patent: Sep. 22, 1992

[54] METHOD OF CONTROLLING A DATA TERMINAL EQUIPMENT FOR EQUALIZING A TRANSMISSION LINE CHARACTERISTIC AND DATA TERMINAL EQUIPMENT USING THE SAME

[75] Inventor: Takeshi Ukegawa, Hadano, Japan

[73] Assignee: Ricoh Company, Ltd., Tokyo, Japan

[21] Appl. No.: 614,520

[22] Filed: Nov. 16, 1990

[30] Foreign Application Priority Data

Nov. 20, 1989 [JP] Japan ................................. 1-299819

[51] Int. Cl.$^5$ .......................................... H04M 11/00
[52] U.S. Cl. ..................... 379/93; 379/100; 375/13; 358/406; 358/438; 358/447
[58] Field of Search ............................ 379/100, 96-98, 379/93; 358/406, 445, 446, 447, 434-436, 438; 375/12, 13

[56] References Cited

U.S. PATENT DOCUMENTS

| | | | |
|---|---|---|---|
| 3,742,360 | 6/1973 | Ragsdale | 375/13 |
| 3,758,881 | 9/1973 | Rummler | 375/12 |
| 4,063,183 | 12/1977 | Evans | 375/13 |
| 4,097,806 | 6/1978 | Evans | 375/13 |
| 4,245,320 | 1/1981 | Desblache | 375/12 |
| 4,477,913 | 10/1984 | Koya et al. | 375/13 |
| 4,768,204 | 8/1988 | Zeiss | 375/12 |

FOREIGN PATENT DOCUMENTS

| | | | |
|---|---|---|---|
| 55-55669 | 4/1980 | Japan | 379/100 |
| 55-70170 | 5/1980 | Japan | 379/100 |
| 57-148458 | 9/1982 | Japan | 358/406 |
| 244171 | 10/1986 | Japan . | |

Primary Examiner—James L. Dwyer
Assistant Examiner—Wing F. Chan
Attorney, Agent, or Firm—Oblon, Spivak, McClelland, Maier & Neustadt

[57] ABSTRACT

A method for controlling a data terminal equipment coupled to a network via a line and coupled to a center apparatus via the line and the network. A plurality of tone signals sent from the center apparatus and having mutually different frequencies are received. The levels of the tone signals are detected. The characteristic of the line is judged on the basis of the levels of the tone signals. A suitable equalizing characteristic most suitable for the characteristic of the line is selected from among a plurality of predetermined equalizing characteristics compensating for possible characteristics of the line. There is also provided a data terminal equipment using the above-mentioned method.

16 Claims, 10 Drawing Sheets

METHOD OF CONTROLLING A DATA TERMINAL EQUIPMENT FOR EQUALIZING A TRANSMISSION LINE CHARACTERISTIC AND DATA TERMINAL EQUIPMENT USING THE SAME

BACKGROUND OF THE INVENTION

The present invention generally relates to a method for controlling data terminal equipment, such as a facsimile machine, and more particularly to a method for controlling data terminal equipment having a plurality of equalizer circuits. Further, the present invention is concerned with a data terminal equipment using such a method.

Recently, group-3 facsimile machines have been widely used. Group-3 facsimile machines have the specifications defined by the CCITT recommendations, and are connected to a public telephone line network. Group-3 facsimile machines are coupled to exchange systems provided in the public telephone line network via non-loaded cables. Thus, as the distance between the facsimile machine and the exchange system increases, high-frequency components of a signal carried via the non-loaded cable deteriorate. Particularly, when a received signal has a deteriorated frequency characteristic, it is impossible to demodulate a modulation signal used, in a high-speed modem (modulator/demodulator), for transmitting image information at a high bit rate. In this case, a data error will frequently occur, and the receiver cannot receive image information transmitted from a transmitter.

Conventionally, in a case as described above, the users of the group-3 facsimile machines call a service center and ask a serviceman to be dispatched. The serviceman measures the characteristics of the line between the facsimile machine and the corresponding exchange system and provides the facsimile machine with an equalizer for compensating for the line characteristics.

However, the above-mentioned maintenance procedure is very troublesome. Recently, the number of personal users of facsimile machines is increasing. Under the above environment, the above-mentioned maintenance procedure is not efficient.

SUMMARY OF THE INVENTION

It is a general object of the present invention to provide an improved data terminal equipment controlling procedure and a data terminal equipment in which the aforementioned problems are eliminated.

A more specific object of the present invention is to provide a data terminal equipment controlling method and a data terminal equipment which need a simplified maintenance procedure.

The above-mentioned objects of the present invention are achieved by a method for controlling a data terminal equipment coupled to a network via a line and coupled to a center apparatus via the line and the network, the method including the steps of determining whether an adjustment mode has been set, and executing the adjustment mode thereafter, receiving a plurality of tone signals sent from the center apparatus, each of the tone signals having mutually different frequencies, detecting levels of the tone signals, judging a characteristic of the line on the basis of the detected tone signal levels, and selecting a suitable equalizing characteristic most suitable for the characteristic of the line from among a plurality of predetermined equalizing characteristics. The selected equalizing characteristics compensates for possible characteristics of the line.

The above-mentioned objects of the present invention are also achieved by a method for controlling a data terminal equipment coupled to a network via a line and coupled to a center apparatus via the line in the network, the method including the steps determining whether an adjustment mode has been set, and executing the adjustment mode thereafter, of receiving a tone signal sent from the center apparatus having a predetermined frequency, detecting a level of the tone signal, and judging a characteristic of the line on the basis of the detected tone signal level. The method further includes adjusting a gain of an amplifier which amplifies signals via the line such that the gain of the amplifier is suitable for the judged characteristic of the line.

The aforementioned objects of the present invention are also achieved by a data terminal equipment coupled to a network via a line and coupled to a center apparatus via the line in the network, the data terminal equipment including determining means for determining whether an adjustment mode has been set, and executing the adjustment mode thereafter, receiving means for receiving signals including a plurality of tone signals sent from the center apparatus, each having mutually different frequencies, tone signal detecting means for detecting levels of the tone signals, judgment means for judging a characteristic of the line on the basis of the detected tone level, and equalizing means for providing a plurality of equalizing characteristics. Selecting means are including for selecting a suitable equalizing characteristic from among a plurality of predetermined equalizing characteristics compensating for the characteristics of the line.

The data terminal equipment may also include determining whether an adjustment mode has been set, and executing the adjustment mode thereafter, receiving means for receiving signals including a tone signal sent from a center apparatus and having a predetermined frequency, tone signal detecting means for detecting a level of the tone signal, judgment means for judging a characteristic of the line on the basis of the detected level of the tone signal, and amplifier means for amplifying the signals. The data terminal equipment may also include adjustment means, coupled to the judgment means and the amplifier means, for adjusting a gain of the amplifier means so that the gain is most suitable for the characteristic of the line.

By compensating for the characteristic of the line attached to the data terminal, the method and data terminal equipment according to the invention optimizes the signal transmission over the line thereby avoiding data errors during the transmission.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
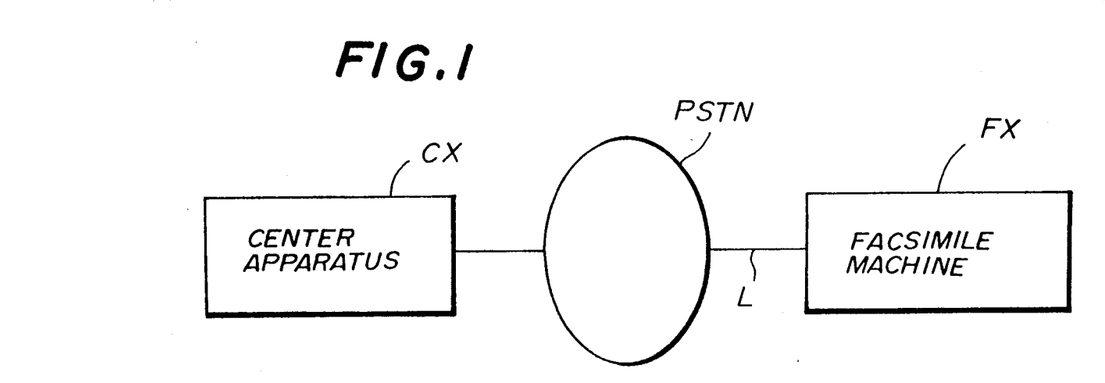
FIG. 1 is a block diagram of a communication system having a center apparatus and a facsimile machine according to the present invention.

Referring to FIG. 1, a facsimile communication system is composed of a center apparatus CX, a group-3 (G-3) facsimile facsimile FX and a public telephone line network PSTN. The present invention is summarized as follows. The center apparatus CX connected to the public telephone line network SPTN sends tone signals thereto. The facsimile machine FX receives the tone signals via the public telephone line network PSTN, and judges the frequency characteristic of a line L (received signal) on the basis of the level of the received reference signal. The facsimile machine FX has a function of providing a plurality of equalizing characteristics for compensating for the received signal frequency characteristic, that is, the characteristic of the line L. A special tone signal which may be one of the tone signals is also used for adjusting the gain of an amplifier for amplifying the received signal on the side of the facsimile machine FX. In the facsimile machine FX, the gain of the amplifier is adjusted on the basis of the level of the received reference signal. With the above-mentioned arrangement, it becomes possible to improve the frequency characteristic of the line L as well as the gain of the amplifier on the basis of the detected line characteristic.

Figure 2:
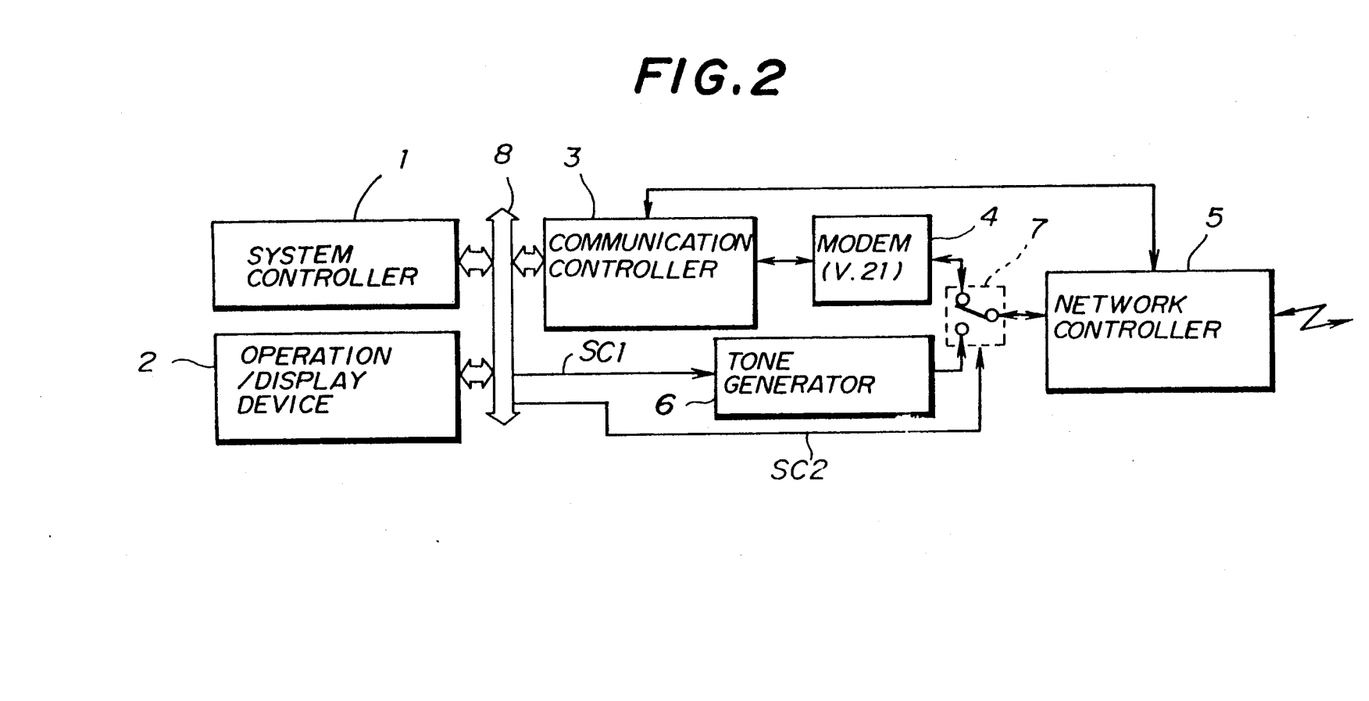
FIG. 2 is a block diagram of the center apparatus shown in FIG. 1.

Referring to FIG. 2, there is illustrated the structure of the center apparatus CX shown in FIG. 1. The center apparatus CX is composed of a system controller 1, an operation/display device 2, a communication controller 3, a modem (modulator/demodulator) 4, a network controller 5, a tone generator 6, a switch 7 and an internal bus 8. The system controller 1, which is formed of, for example, a control processing unit, controls the entire operation of the center apparatus CX. The operation/display device 2 is composed of an input part having a plurality of keys, and a display part. The operator inputs necessary information via the input part of the operation/display device 2 and obtains information via the display part thereof. The communication controller 3 executes a transmission control procedure for communicating with the facsimile machine FX via the network PSTN in a reception adjustment mode. This transmission control procedure will be described in detail later. The modem 4 realizes a low-speed modem function (V.21 modem) defined by the CCITT Recommendation V.21 for transferring transmission procedure signals between the center apparatus CX and the facsimile machine FX. The network controller 5 connects the center apparatus CX to the network PSTN, and has an automatic call sending function. The tone generator 6 generates a plurality of tone signals having mutually different frequencies. The switch 7 selects either the modem 4 or the tone generator 6 and connects the selected device to the network controller 5. The operation of the tone generator 6 as well as the switching operation of the switch 7 are controlled by the system controller 1. The system controller 1 outputs a control signal SC1 to the tone generator 6. The control signal SC1 designates the frequency and level of the tone signal which is to be sent to the network controller 5. The system controller 1 outputs, to the switch 7, a control signal SC2 for controlling the switching operation of the switch 7. The internal bus 8 mutually connects the system controller 1, the operation/display device 2, the communication controller 3, the tone generator 6 and the switch 7.

Figure 3:
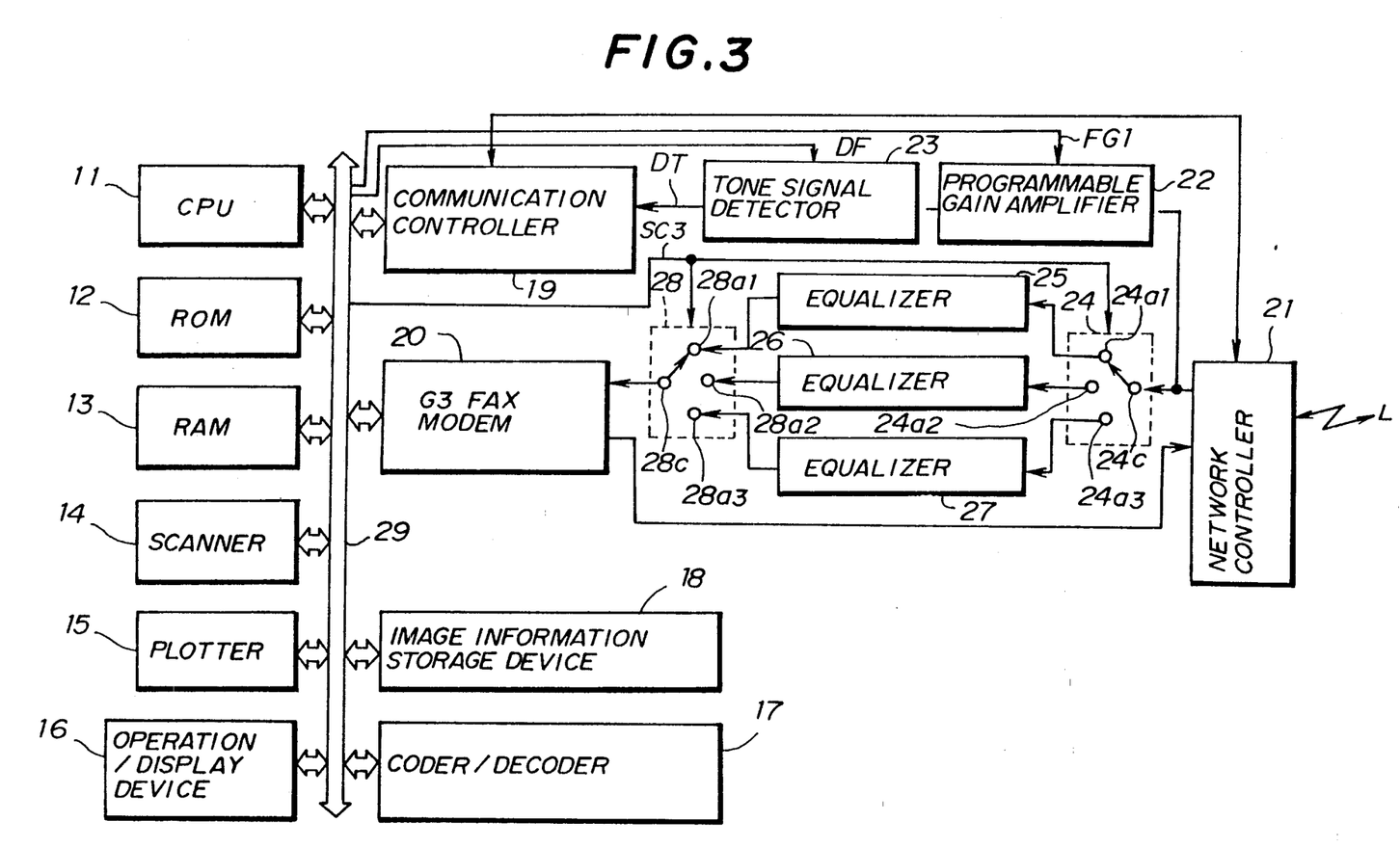
FIG. 3 is a block diagram of the facsimile machine shown in FIG. 1.

Referring to FIG. 3, there is illustrated the structure of the facsimile machine FX shown in FIG. 1. A central processing unit (hereafter simply referred to as a CPU) 11 controls the entire operation of the facsimile machine FX. A read only memory (hereafter simply referred to as a ROM) 12 stores control programs executed by the CPU 11, and a variety of data necessary to execute the control programs. A random access memory (hereafter simply referred to as a RAM) 13 functions as a working area of the CPU 11, and stores a variety of information inherent in the group-3 facsimile machine FX. A scanner 14 optically reads an original to be transmitted at a predetermined resolution level, and outputs a corresponding electrical signal. A plotter 5 records an image on a recording media, such as, paper, at a predetermined resolution level. An operation/display device 16 is provided for operating the facsimile machine FX, and an input part having keys and a display part on which various messages are displayed.

A coder/decoder (codec) 17 codes an image signal to thereby generate compressed image information, and decodes compressed image information to reproduce the original image signal. An image information storage device 18 stores compressed information. A communication controller 19 executes a transmission control procedure of the group-3 facsimile machine FX as defined by the CCITT recommendations. A group-3 facsimile modem 20 realizes a group-3 facsimile modem function, and a low-speed modem function (V.21 modem) of transmitting transmission procedure signals and a high-speed modem function (V.27ter modem defined by the CCIT recommendations) of transmitting image information. A network controller 21 connects the facsimile machine FX to the network PSTN, and has an automatic calling function in the same way as the network controller 5 shown in FIG. 1.

A programmable gain amplifier 22 amplifies a received signal output by the network controller 21, and outputs an amplified received signal to a tone signal detector 23. The tone signal detector 23 is capable of detecting a plurality of tone signals having mutually different frequencies. Further, the tone signal detector 23 has the function of determining whether or not the tone signal having the detected frequency is equal or higher than a predetermined level. The detection result is sent, as a detection signal DT, to the communication controller 19.

Figure 4A:
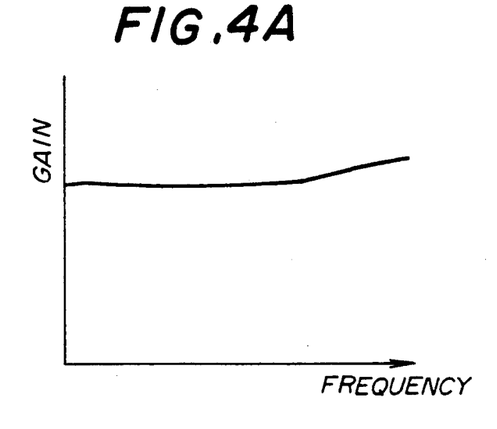
FIGS. 4A, 4B and 4C are respectively graphs showing the equalizing characteristics of equalizers shown in FIG. 3.
Figure 4B:
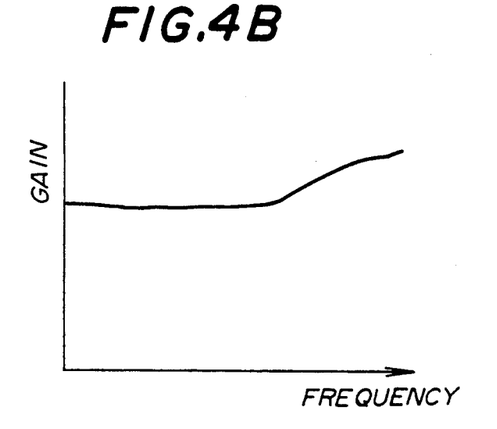
Figure 4C:
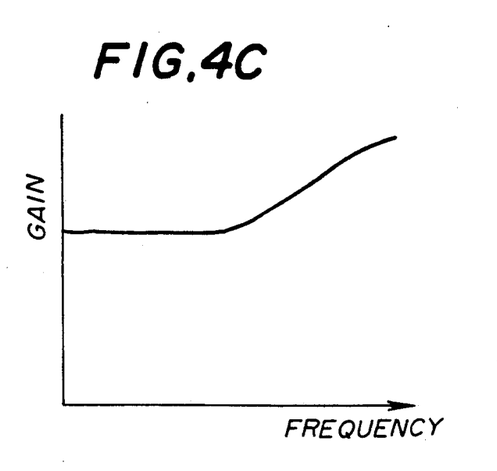

A switch 24 has a common terminal 24c, and switched terminals 24a1, 24a2 and 24a3. The received signal output by the network controller 21 is applied to the common terminal 24c of the switch 24. The switched terminals 24a1, 24a2 and 24a3 are respectively connected to input terminals of equalizers 25, 26 and 27. The equalizers 25, 26 and 27 are provided for compensating for the frequency characteristic of the received signal, and have mutually different frequency responses. FIGS. 4A, 4B and 4C are graphs illustrating the relationships between the frequency and the gain of the equalizers 25, 26 and 27, respectively. As shown, the equalizer 26 has a compensation gain of high frequencies greater than that of the equalizer 25 and the equalizer 27 has a compensation gain of high frequencies greater than that of the equalizer 26. Output signals of the equalizers 25, 26 and 27 are applied to the terminals 28a1, 28a2 and 28a3 of a switch 28, respectively. A common terminal 28c of the switch 28 is connected to a received signal input terminal of the group-3 facsimile modem 20. A transmission signal output terminal of the group-3 facsimile modem 20 is connected to an input terminal of the network controller 21.

A system bus 29 mutually connects the CPU 11, the ROM 12, the RAM 13, the scanner 14, the plotter 15, the operation/display device 16, the coder/decoder 17, the image information storage device 18, the communication controller 19 and the group-3 facsimile modem 20. Data are transmitted between the above structural elements mainly via the system bus 29.

The gain of the programmable gain amplifier 22 is controlled by a control signal FGI generated and output by the CPU 11. The frequency of the input signal applied to the tone signal detector 23 is controlled by a control signal DF generated and output by the CPU 11. The switching operations of the switches 24 and 28 are controlled by a control signal SC3 generated and output by the CPU 11.

Figure 5:
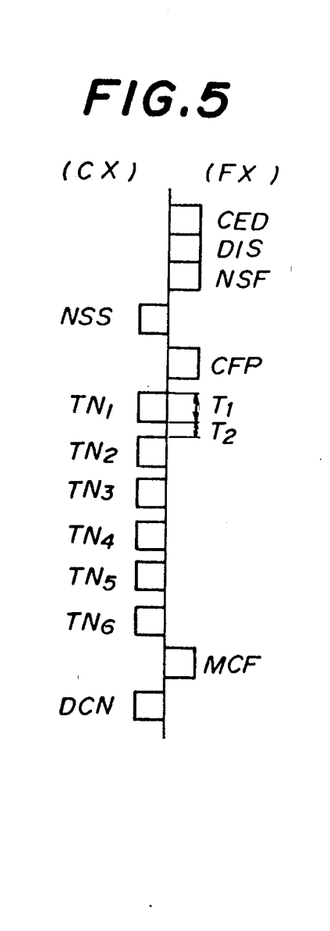
FIG. 5 is a diagram illustrating a communication procedure executed in a reception adjustment mode in the communication system shown in FIG. 1.

It is now assumed that the facsimile machine FX frequently has a transmission error while receiving image information. The operator of the facsimile machine FX calls the operator of the center apparatus CX, and requests a reception adjustment operation. The operator of the center apparatus CX is informed of the telephone number of the facsimile machine FX and calls it. The facsimile machine FX receives the call from the center apparatus CX and sends back a called station identification (CED) signal to the center apparatus CX, as shown in FIG. 5. The CED signal shows that the facsimile machine is a non-speech terminal, such as a telephone set. Subsequent to the CED signal, the facsimile machine FX sends a digital identification (DIS) signal used for informing the other party of standard transmission facilities provided in the facsimile machine FX to the center apparatus CX, and then sends a non-standard facilities (NSF) signal informing the other party of non-standard transmission facilities. The NSF signal includes information showing that the facsimile machine FX has a reception adjustment function.

The center apparatus CX recognizes, from the NSF signal, that the facsimile machine FX has the reception adjustment function. Then, the center apparatus CX sends a non-standard facility setting (NSS) signal to the facsimile machine FX. In response to the NSS signal, the facsimile machine FX sends back a confirmation (CFR) signal to the center apparatus CX, since it has the reception adjustment function.

In response to the CFR signal, the center apparatus CX outputs the control signal SC1 to the tone generator 6 (FIG. 2) and instructs it to continuously generate a tone signal TN1 having a frequency F1 at a predetermined level during a predetermined time T1. After a predetermined time T2 from a time when the center apparatus CX completes the sending of the tone signal TN1, the center apparatus CX continuously sends the facsimile machine FX a tone signal TN2 having a frequency F2 at the same level (as the tone signal TN1) for the predetermined time T1. In this way, the center apparatus CX sends the facsimile machine FX tone frequencies TN3, TN4, TN5 and TN6 respectively having frequencies F3, F4, F5 and F6 for the predetermined time T1 with the rest time T2.

On the other hand, the CPU 11 of the facsimile machine FX instructs the tone signal detector 23 to switch the detection frequency in the order of F1, F2, F3, F4, F5 and F6 so that it can successively detect the tone signals TN1, TN2, TN3, TN4, TN5 and TN6. During this operation, the tone signal detector 23 detects the levels of the tone signals TN1, TN2, TN3, TN4, TN5 and TN6. The CPU 11 judges the characteristic of the line connected to the facsimile machine FX on the basis of the detected levels of the tone signals TN1, TN2, TN3, TN4, TN5 and TN6, and selects an optimal one of the equalizers 25, 26 and 27. Then, the CPU 11 outputs the control signal SC3 to the switches 24 and 28.

Figure 6:
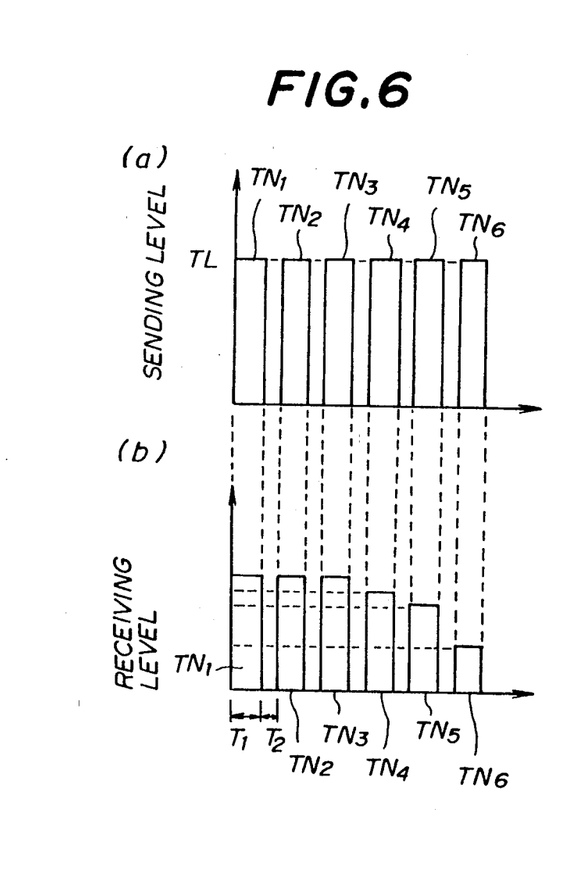
FIGS. 6(a) and 6(b) are diagrams illustrating the relationship between tone signals and the levels of these tone signals obtained when they are received by the facsimile machine shown in FIGS. 1 and 3.

For example, FIG. 6(a) shows the tone signals TN1, TN2, TN3, TN4, TN5 and TN6 having a fixed transmission level TL, and FIG. 6(b) shows IG.6, the tone signals TN1, TN2, TN3, TN4, TN5 and TN6 received by the facsimile machine FX. As the frequency of the tone signal increases, the level of the received tone signal decreases. The CPU 11 selects the optimal equalizer from among the equalizers 25, 26 and 27 which has the frequency characteristic making it possible to receive all the tone signals TN1 through TN6 at almost the same level. When the CPU 11 determines that the last tone signal TN6 has been received, it sends back a message confirmation (MCF) signal to the center apparatus CX via the communication controller 3. The center apparatus CX receives the MCF signal from the facsimile machine FX after sending the last tone signal TN6, and then sends a disconnect (DCN) signal to the facsimile machine FX. After that, the center apparatus CX disconnects its own from the line being used. The facsimile machine FX receives the DCN signal and releases the line from the used state. As a result of the above-mentioned reception adjustment procedure, it becomes possible to provide the facsimile machine with the equalizer characteristic optimum to the line.

Figure 7:
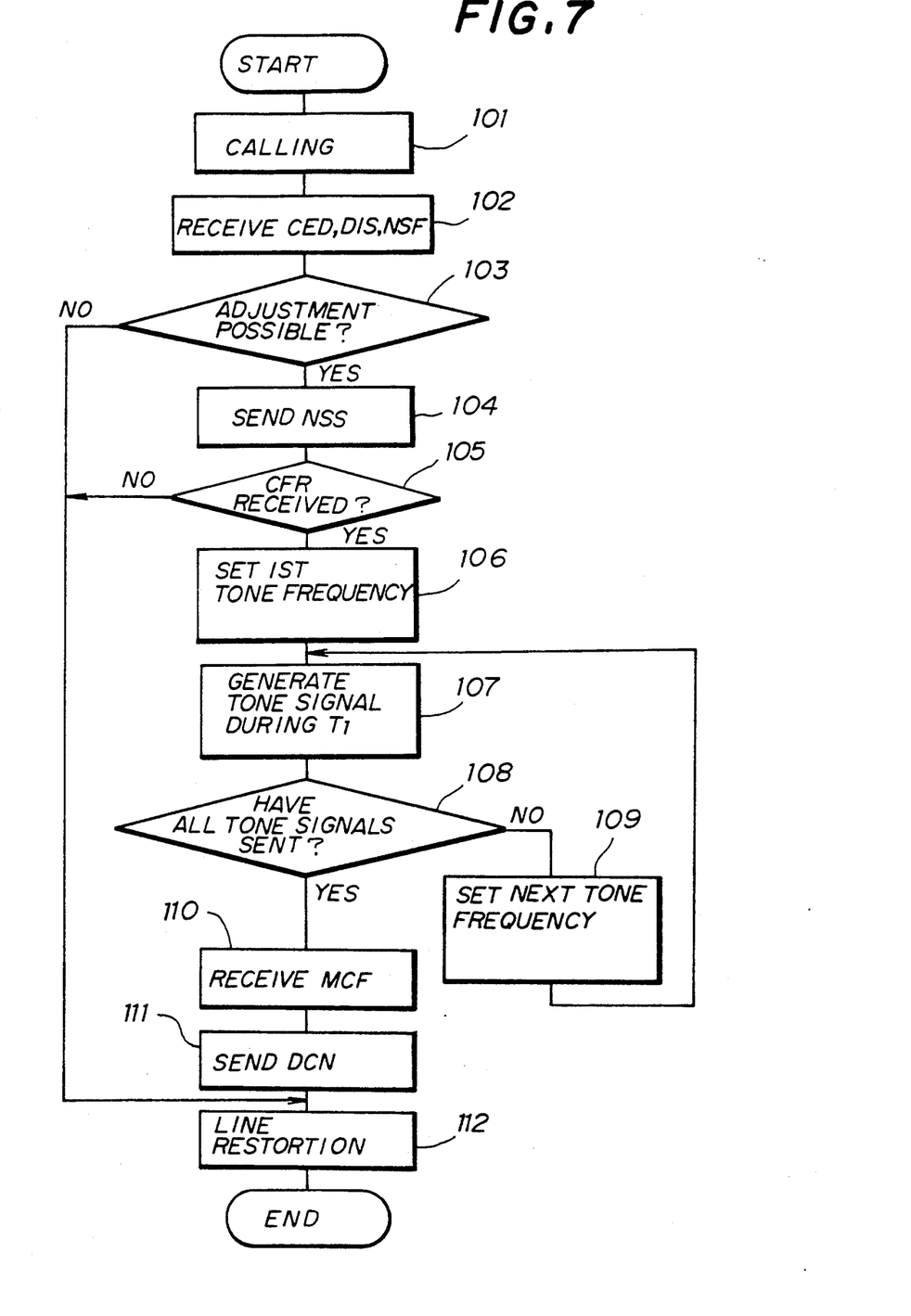
FIG. 7 is a flowchart illustrating the operation of the center apparatus shown in FIGS. 1 and 2.

Referring to FIG. 7, there is illustrated the operation of the center apparatus CX controlled by the system controller 1 shown in FIG. 2. At step 101, the operator of the center apparatus CX is informed of the telephone number of the facsimile machine FX by the operator thereof and calls the facsimile machine FX. At step 102, the center apparatus CX successively receives the CED, DIS and NSF signals from the facsimile machine FX. At step 103, the system controller 1 determines whether or not the facsimile machine FX has the reception adjustment function on the basis of the contents of the NSF signal received at step 102.

When the result at step 103 is YES, at step 104, the system controller 1 controls the communication controller 3 so that it outputs the NSS signal indicating the execution of the reception execution operation. At step 105, the system controller 1 determines whether or not the facsimile machine FX returns the CFR signal which indicates that it is ready for reception. When the result at step 105 is YES, at step 106, under the control of the system controller 1, the communication controller 3 outputs the control signal SC1 to the tone generator 6 so that it generates the tone signal TN1 having the frequency F1. At step 107, the system controller 1 starts an internal timer (software or program timer) and makes the tone generator 6 to continuously generate the tone signal TN1 for the predetermined period T1. At step 108, the system controller 1 determines whether or not all the tone signals TN1 through TN6 have been sent. When the result at step 108 is NO, the system controller 1 outputs the control signal SCI to the tone generator 6 via the communication controller 3 so that it generates the tone signal TN2 having the frequency N2. In the above-mentioned way, all the tone signals TN1 through TN6 are sequentially output for the predetermined period T1 with the rest time T2. When the result obtained at step 108 is YES, at step 110, the system controller 1 receives the message confirmation (MCF) signal via the network controller 5 and the communication controller 3. At step 111, the system controller 1 controls the communication controller 3 so that it outputs the disconnect (DCN) signal, and restores the line at step 112.

On the other hand, if the facsimile machine FX does not have the reception adjustment function and thus the result obtained at step 103 is NO, or if it is determined, at step 105, that the CFR signal is not received, the system controller 1 immediately executes step 112.

Figure 8:
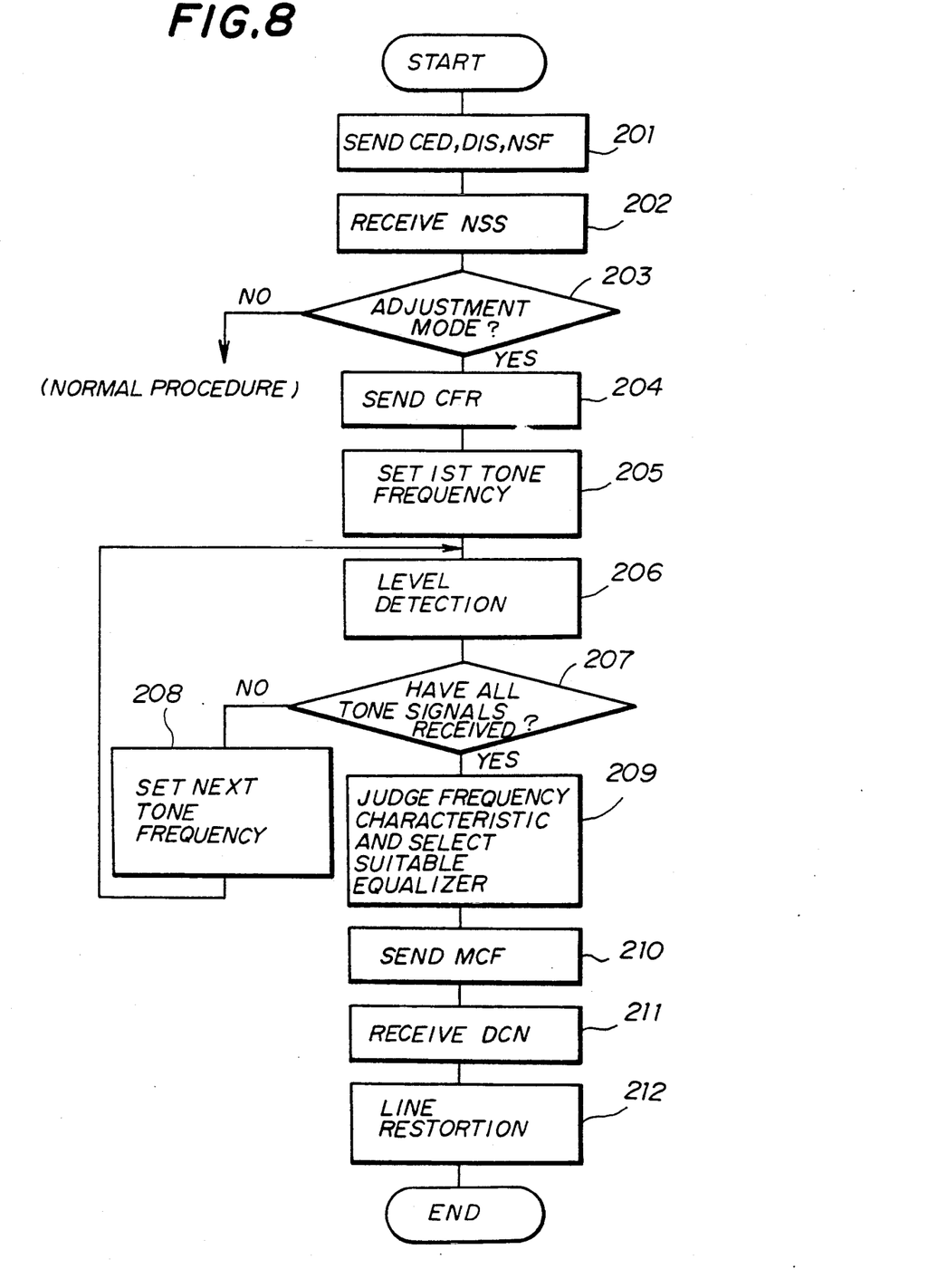
FIG. 8 is a flowchart illustrating the operation of the facsimile machine shown in FIGS. 1 and 3.

Referring to FIG. 8, there is illustrated the operation of the facsimile machine FX controlled by the CPU 11. After the facsimile machine FX receives the call from the center apparatus CX, it successively outputs the CED, DIS and NSF signals at step 201. At step 202, the CPU 11 receives the NSS signal 202 via the communication controller 19. At step 203, the CPU 11 determines whether or not the reception adjustment mode is instructed on the basis of the contents of the NSS signal received at step 202. When the result at step 203 is YES, at step 204, the CPU 11 controls the communication controller 19 so that it outputs the CFR signal representing that it is completely ready for receiving signals. At step 205, the CPU 11 outputs the control signal DF, which causes the tone signal detector 23 to detect the tone signal TN1 having the frequency F1. At step 206, the CPU 11 receives the tone signal detection signal DT output by the tone signal detector 23 via the communication controller 19, and detects the level thereof. At step 207, the CPU 11 determines whether or not all the tone signals TN1 through TN6 have been received. When the result at step 207 is NO, at step 208, the CPU 11 outputs the control signal DF to the tone signal detector 23 so that it detects the next tone signal TN2. In the above-mentioned way, when all the tone signals have been received, at step 209, the CPU 11 judges the frequency characteristic of the line on the basis of the levels of the tone signals TN1 through TN6, and selects the most suitable equalizer from among the equalizers 25, 26 and 27. At step 210, the CPU 11 controls the communication controller 19 so that it outputs the message confirmation (MCF) signal. At step 211, the communication controller 19 receives the disconnect (DCN) message from the center apparatus CX. At step 212, the communication controller 19 restores the line from the captured state.

On the other hand, when the result obtained at step 203 is NO, which means that the reception adjustment mode is not specified in the NSS signal, the CPU 11 carries out a normal receiving procedure so that the facsimile machine FX is ready for receiving image information.

Figure 9:
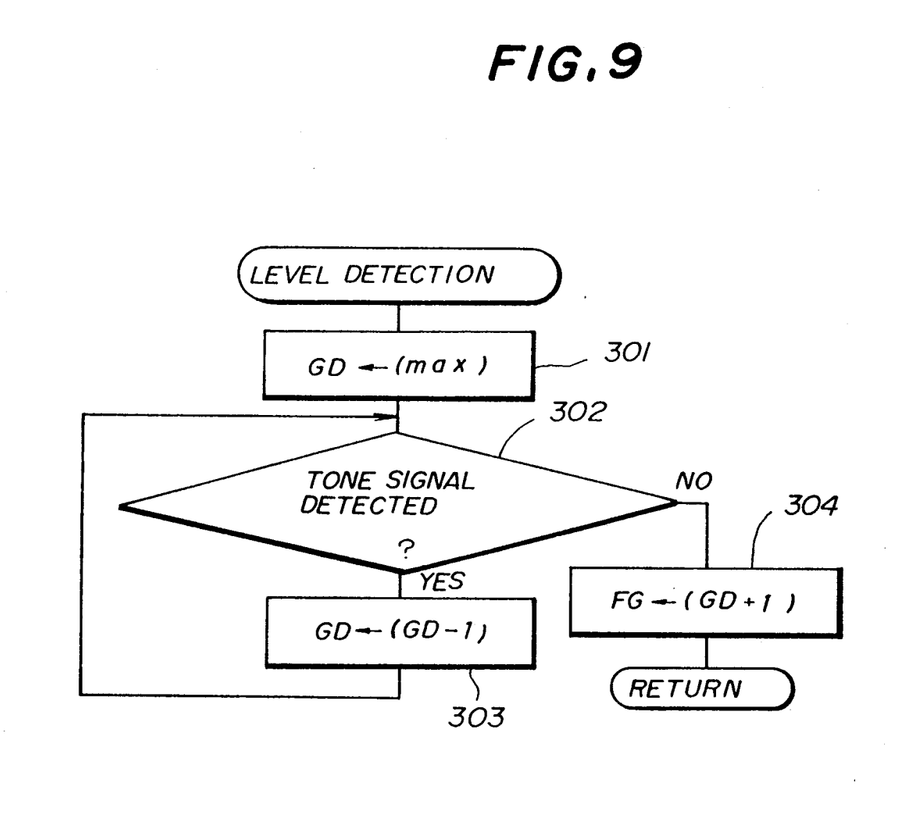
FIG. 9 is a flowchart illustrating how to detect the levels of the tone signals sent from the center apparatus shown in FIGS. 1 and 2.

FIG. 9 is a flowchart illustrating an example of the level detecting procedure executed at step 206 shown in FIG. 8. At step 301, the CPU 11 outputs the control signal FG1 to the programmable gain amplifier 22 so that it has a maximum gain. At step 302, the CPU 11 determines whether or not the tone signal detection signal DT output by the tone signal detector 23 indicates the detection of the tone signal. When the result at step 302 is YES, the CPU 11 decreases the gain (labeled GD) of the programmable gain amplifier 22 by one step at step 303, and executes step 302 again. At step 302, the CPU 11 determines the tone signal detection signal DT indicates the detection of the tone signal by using the one-step reduced gain (GD-1). By repeatedly carrying out the steps 302 and 303, the gain GD of the programmable gain amplifier 22 decreases. When the result obtained at step 302 is NO, the CPU 11 increases the value of a variable FG by 1. The variable FG1 indicates the least detection level capable of detecting the tone signal being considered. The value of the variable FG1 is stored in the RAM 13 shown in FIG. 3.

A description will now be given of a second preferred embodiment of the present invention with reference to FIGS. 10 through 13. The second preferred embodiment of the present invention is directed to adjusting the gain of the line connected to the facsimile machine FX obtained when it is in the receiving mode on the basis of the frequency characteristic of the line obtained by analyzing the level of a reference tone signal.

Figure 10:
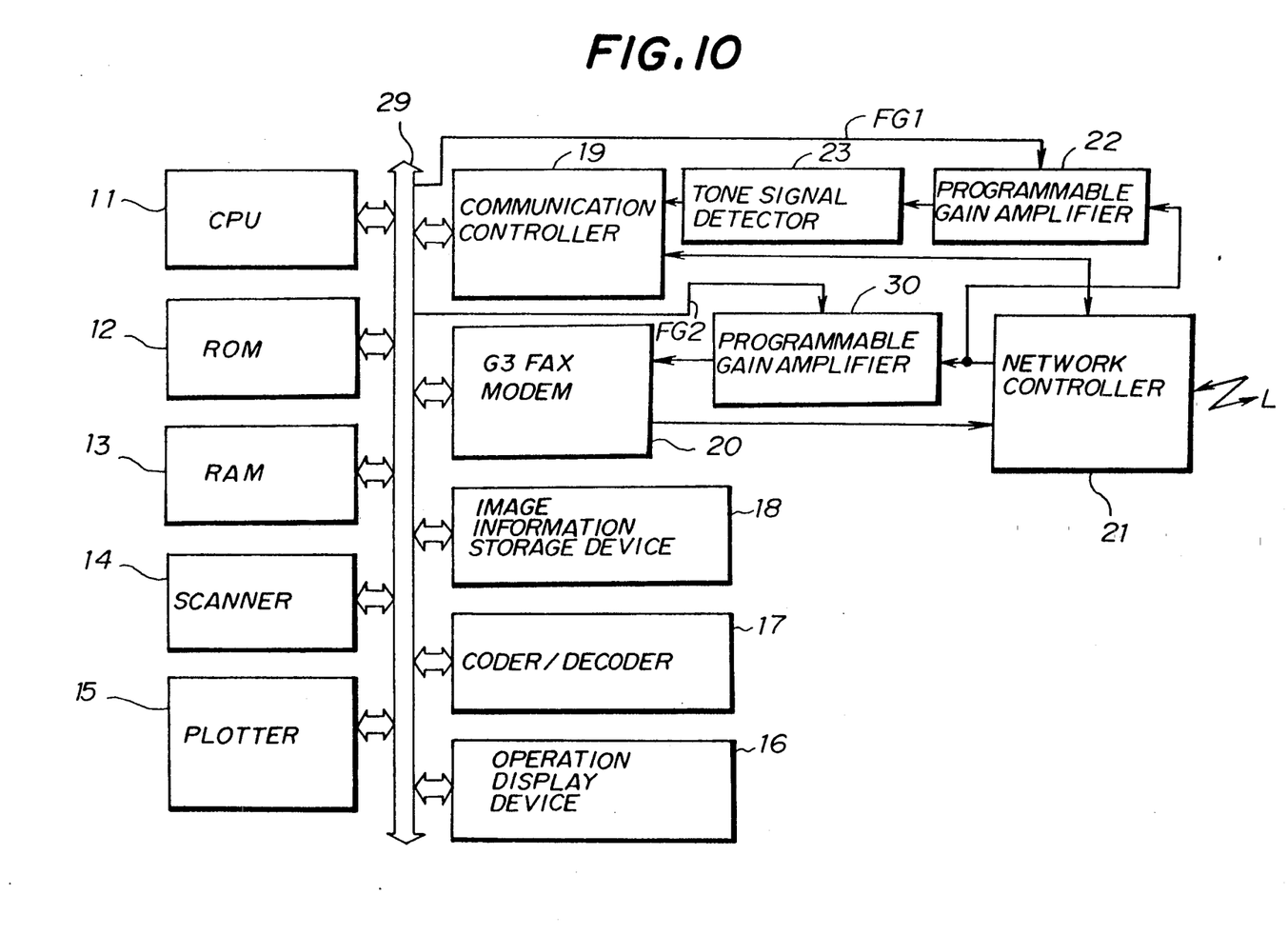
FIG. 10 is a block diagram illustrating a facsimile machine according to a second preferred embodiment of the present invention.

Referring to FIG. 10, there is illustrated the structure of the facsimile machine FX according to the second preferred embodiment of the present invention. In FIG. 10, those parts which are the same as those shown in the previous figures are given the same reference numerals. It is possible to use the center apparatus CX shown in FIG. 2 when the facsimile machine FX shown in FIG. 10 is used in place of the facsimile machine FX shown in FIG. 2. A programmable gain amplifier 30 is provided in a receiving line between the network controller 21 and the group-3 facsimile modem 20. The programmable gain amplifier 30 controls the gain of the received signal output by the network controller 21. An amplified received signal supplied from the programmable gain amplifier 30 is input to the group-3 facsimile machine 20.

Figure 11:
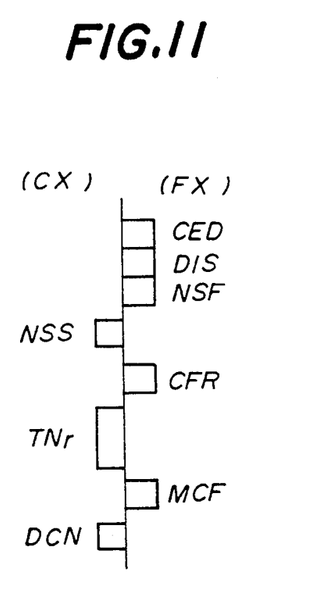
FIG. 11 is a diagram illustrating a communication procedure executed in a reception adjustment mode according to the second preferred embodiment of the present invention.

Referring to FIG. 11, there is illustrated a transmission procedure executed in the reception adjustment operation. The center apparatus CX calls the facsimile machine FX by specifying the telephone number thereof. The facsimile machine FX receives the call from the center apparatus CX, and then sends back the CED, DIS and NSF signals thereto in this order. The center apparatus CX acknowledges, from the contents of the NSF signal, that the facsimile machine FX has the reception adjustment function. In this case, the center apparatus CX outputs the NSS signal to the facsimile machine FX.

In response to the NSS signal, the facsimile machine FX sends back the CFR signal to the center apparatus CX and shifts the reception adjustment mode. The center apparatus CX receives the CFR signal, and the system controller 1 outputs the control signal SCI to the tone generator 6 so that it continuously generates a tone signal TNr having a reference frequency FR.

On the other hand, the tone signal TNr is input to the tone signal detector 23 via the network controller 21 and the programmable gain amplifier 22. The tone signal detector 23 detects the level of the received tone signal TNr, and outputs the CPU 11 via the communication controller 19 and the system bus 29. The CPU 22 outputs a control signal FG2 to the programmable gain amplifier 30 so that it has a gain suitable for the level of the received tone signal TNr. When the receiving of the tone signal is completed, the communication controller 19 outputs the message confirmation (MCF) signal to the center apparatus CX. When the MCF signal is received, the center apparatus CX sends the disconnect (DCN) signal to the facsimile machine FX and restores the line. Thereby, the reception adjustment operation on the center apparatus side is ended. The facsimile machine FX receives the DCN signal and then restores the line. Thereby, the reception adjustment operation on the side of the facsimile machine FX is ended.

As described above, according to the second preferred embodiment of the present invention, the gain of the programmable gain amplifier 30 for amplifying the received signal is controlled on the basis of the detected level of the tone signal TNr having the reference frequency FR. Thus, it becomes possible to obtain the reception gain sufficient to receive information and suitably carry out the demodulating operation of the facsimile machine FX.

Figure 12:
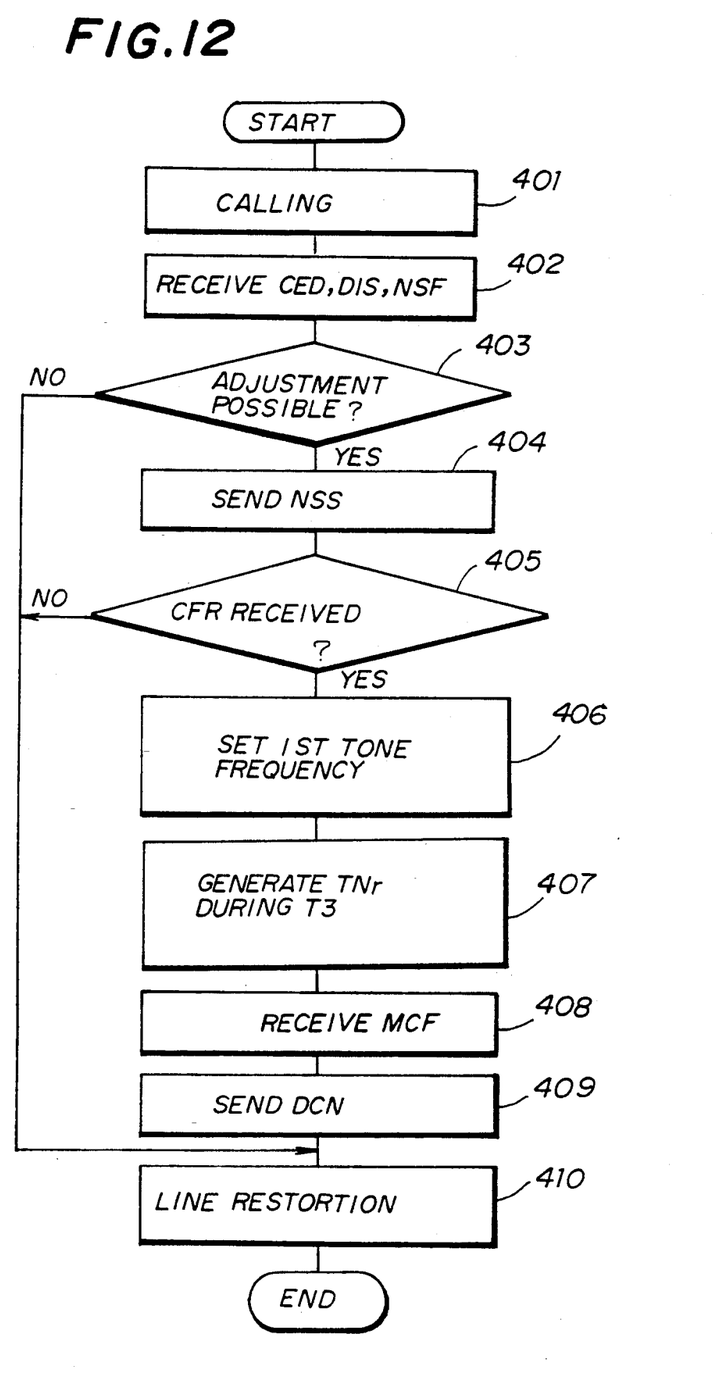
FIG. 12 is a flowchart illustrating the operation of the center apparatus according to the second preferred embodiment of the present invention.

Referring to FIG. 12, there is illustrated the operation of the center apparatus CX controlled by the built-in system controller 2 shown in FIG. 2. At step 401, the operator of the center apparatus CX calls the facsimile machine by using the telephone number thereof. At step 402, the center apparatus CX successively receives the CED, DIS and NSF signals in this order. At step 403, the system controller 2 determines whether or not the facsimile machine FX has the reception adjustment function on the basis of the contents of the NSF signal received at step 402. When the result obtained at step 403 is NO, at step 410, the system controller 1 instructs the communication controller 3 so that the center apparatus CX is disconnected from the line, so that the line is restored.

On the other hand, when the result obtained at step 403 is YES, at step 404, the system controller 1 controls the communication controller 3 so that it outputs the NSS signal. At step 405, the the system controller 1 determines whether or not the CFR signal is received. When the result at step 405 is YES, at step 406, the system controller 1 outputs the control signal SCI to the tone generator 6 so that it generates the tone signal TNr having the reference frequency FR and the reference level. At step 407, the system controller 1 controls the tone generator 6 so that it continuously generates the tone signal TNr for a predetermined time T3.

After the sending of the tone signal TNr is completed, at step 408, the communication controller 3 receives the message confirmation (MCF) sent from the facsimile machine FX. At step 409, the communication controller 3 outputs the disconnect (DCN) signal, and restores the line at step 410.

Figure 13:
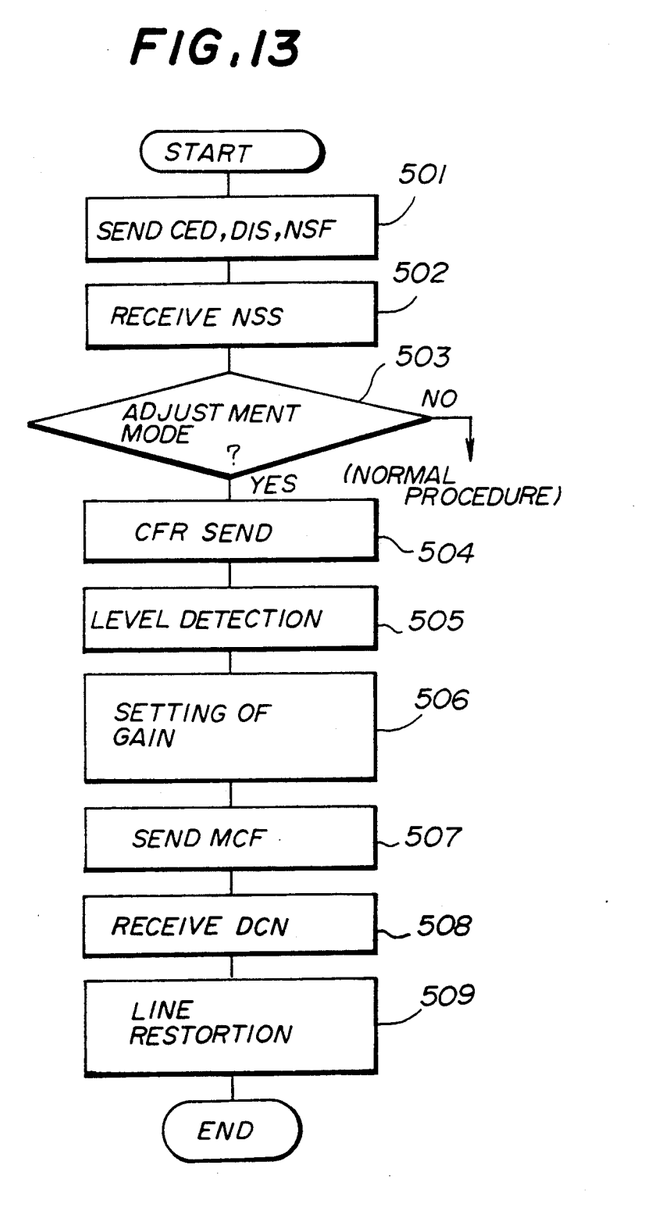
FIG. 13 is a flowchart illustrating the operation of the facsimile machine according to the second preferred embodiment of the present invention.

Referring to FIG. 13, there is illustrated the operation of the facsimile machine shown in FIG. 10. At step 501, the communication controller 19 successively sends the CED, DIS and NSF signals in this order. At step 502, the CPU 11 receives the NSS signal output by the center apparatus CX via the network controller 21 and the communication controller 19. At step 503, the CPU 11 determines whether or not the reception adjustment operation is specified in the NSS signal. When the result at step 503 is NO, the CPU 11 executes the normal facsimile procedure. On the other hand, when the result at step 503 is YES, the CPU 11 controls the communication controller 19 so that it sends the CFR signal. At step 505, the the CPU 11 receives the tone signal detection signal output by the tone signal detector 23, and detects the tone signal TNr in accordance with the procedure shown in FIG. 9. At step 506, the CPU 11 determines a suitable gain on the basis of the level of the received tone signal, and outputs the control signal FG2 to the programmable gain amplifier 30 so that it has the suitable gain. At step 507, the CPU 11 controls the communication controller 19 so that it sends the MCF signal to the center apparatus CX. At step 508, the communication controller 19 receives the DCN signal from the center apparatus CX. At step 509, the communication controller 19 restores the line being used.

In the aforementioned first preferred embodiment of the present invention, the six tone signals are used. However, it is also possible to use more than or less than six tone signals in order to judge the characteristic of the line obtained when receiving information. In the first embodiment, the three equalizers 25, 26 and 27 are used. However, it is also possible to use two or more than three equalizers or use a single equalizer which is capable of providing variable equalizing characteristics.

The present invention is not limited to the specifically disclosed embodiments, and variations and modifications may be made without departing from the scope of the present invention.

What is claimed is:

1. A method for controlling a data terminal equipment coupled to a network via a line and coupled to a center apparatus via said line and said network, said method comprising the steps of:

determining whether an adjustment mode between said center apparatus and said data terminal equipment has been set;

executing said adjustment mode after it is determined that said adjustment mode has been set including:

receiving a plurality of tone signals sent from said center apparatus and having mutually different frequencies;

detecting levels of said tone signals;

judging a characteristic of said line on the basis of the levels of said tone signals detected by said detecting step; and selecting a suitable equalizing characteristic most suitable for the characteristic of said line judged by said judging step from among a plurality of predetermined equalizing characteristics compensating for possible characteristics of said line by one of selecting one of a plurality of equalizers having respective of said equalizing characteristics and adjusting a gain of a programmable gain amplifier.

2. A method as claimed in claim 1, wherein said detecting step comprises:
respectively determining whether or not said tone signals are received by using a maximum amplitude gain at which said tone signals are amplified;
repeatedly decreasing said maximum reception gain by a predetermined level when it is determined that said tone signals are received; and
identifying respective reduced amplitude gains at which the tone signals are not received, and
wherein said judging step comprises the step of judging the characteristic of said line on the basis of said respective reduced amplitude gains.

3. A method as claimed in claim 1, wherein said receiving step receives said tone signals for a predetermined period.

4. A method as claimed in claim 1, wherein said line comprises a public telephone line.

5. A method for controlling a data terminal equipment coupled to a network via a line and coupled to a center apparatus via said line and said network, said method comprising the steps of:
determining whether an adjustment mode between said center apparatus and said data terminal equipment has been set;
executing said adjustment mode after it is determined that said adjustment mode has been set including:
receiving a tone signal sent from said center apparatus and having a predetermined frequency;
detecting a level of said tone signal;
judging a characteristic of said line on the basis of the level of said tone signal detected by said detecting step; and
adjusting a gain of an amplifier which amplifies signals received via said line so that the gain of the amplifier is suitable for the characteristic of said line judged by said judging step.

6. A method as claimed in claim 5, wherein detecting step comprises:
setting the gain of said amplifier to a maximum gain;
determining whether or not said tone signal is received by using said maximum gain;
decreasing said maximum reception gain by a predetermined level when it is determined that tone signal is received; and
identifying a reduced amplitude gain at which the tone signal is not received, and
wherein said judging step comprises the step of judging the characteristic of said line on the basis of said reduced amplitude gain.

7. A method as claimed in claim 5, wherein said line comprises a public telephone line.

8. A terminal equipment coupled to a network via a line and coupled to a center apparatus via said line and said network, said data terminal equipment comprising:
determining means for determining whether an adjustment mode between said center apparatus and said data terminal equipment has been sand executing said adjustment mode after it is determined that said adjustment mode has been set;
receiving means for receiving signals including a plurality of tone signals which are sent from said center apparatus and which have mutually different frequencies;
tone signals detecting means for detecting levels of said tone signals;
judging means for judging a characteristic of said line on the basis of the levels of said tone signals detected by said tone signal detecting means; and
selecting means for selecting suitable equalizing characteristic most suitable for the characteristic of said line judged by said judgment means from among said plurality of predetermined equalizing characteristics compensating for possible characteristics of said line by one of selecting one of a plurality of equalizers having respective of said equalizing characteristics and adjusting a gain of a programmable gain amplifier.

9. A data terminal equipment as claimed in claim 8, wherein said tone signal detecting means comprises:
means for respectively determining whether or not said tone signals are received by using a maximum amplitude gain at which said tone signals are amplified;
means for repeatedly decreasing said maximum reception gain by a predetermined level when it is determined that said tone signals are received; and
means for identifying respective reduced amplitude gains at which the tone signals are not received, and
wherein said judgment means comprises means for judging the characteristic of said line on the basis of said respective reduced amplitude gains.

10. A data terminal equipment as claimed in claim 8, wherein:
said equalizing means comprises a plurality of equalizers having mutually different equalizing characteristics, and
wherein said selecting means comprises;
first switch means, provided on input sides of said equalizers, for selecting one of said equalizers which is most suitable for the characteristic of said line judged by said judgment means; and
second switch means, provided on output sides of said equalizers, for selecting said one of the equalizers, so that said one of the equalizers is coupled between said line and said receiving means.

11. A data terminal equipment as claimed in claim 8, wherein said signals comprises facsimile information signals.

12. A data terminal equipment as claimed in claim 8, wherein said line comprises a public telephone line.

13. A data terminal equipment coupled to a network via a line and coupled to a center apparatus via said line and said network, said data terminal equipment comprises:
determining means for determining whether an adjustment mode between said center apparatus and said data terminal equipment has been set and executing said adjustment mode after it is determined that said adjustment mode has been set;
receiving means for receiving signals including a tone signal sent from said center apparatus and having a predetermined frequency;
tone signal detecting means for detecting a level of said tone signal;
judgment means for judging a characteristic of said line on the basis of the level of said tone signal detected by said tone signal detecting means; and
amplifier means for amplifying said signals; and
adjustment means, coupled to said judgment means and said amplifier means, for adjusting a gain of said amplifier means so that the gain of the amplifier means is most suitable for the characteristic of said line judged by said judgment means.

14. A data terminal equipment as claimed in claim 13, wherein said tone control detecting means comprises:
- means for setting the gain of said amplifier means to a maximum gain;
- means for determining whether or not said tone signal is received by using said maximum gain;
- means decreasing said maximum reception gain by a predetermined level when it is determined that tone signal is received; and
- means for identifying a reduced amplitude gain at which the tone signal is not received, and wherein said judgment means comprises means for judging the characteristic of said line on the basis of said reduced amplitude gain.

15. A data terminal equipment as claimed in claim 13, wherein said line comprises a public telephone line.

16. A data terminal equipment as claimed in claim 13, wherein said signals comprises facsimile information signals.

* * * * *